(12) United States Patent
Kent

(10) Patent No.: US 8,788,898 B2
(45) Date of Patent: Jul. 22, 2014

(54) REMOTE TESTING SYSTEM

(75) Inventor: Edward Kent, Marlow (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 355 days.

(21) Appl. No.: 13/153,128

(22) Filed: Jun. 3, 2011

(65) Prior Publication Data

US 2011/0298530 A1 Dec. 8, 2011

(30) Foreign Application Priority Data

Jun. 3, 2010 (GB) .................................. 1009306.0

(51) Int. Cl.

| | |
|---|---|
| *G01R 31/28* | (2006.01) |
| *G06F 11/00* | (2006.01) |
| *G11C 29/00* | (2006.01) |
| *H04B 1/04* | (2006.01) |
| *H04B 1/16* | (2006.01) |
| *H04B 1/38* | (2006.01) |
| *G01R 31/40* | (2014.01) |
| *G01R 31/317* | (2006.01) |
| *G11C 5/14* | (2006.01) |
| *G11C 11/22* | (2006.01) |
| *G11C 13/00* | (2006.01) |
| *G01R 31/3185* | (2006.01) |
| *G06F 21/81* | (2013.01) |
| *H04W 52/00* | (2009.01) |
| *H04W 52/02* | (2009.01) |
| *H04W 52/30* | (2009.01) |
| *H04W 52/38* | (2009.01) |

(52) U.S. Cl.

CPC ............. *G01R 31/31721* (2013.01); *G11C 5/14* (2013.01); *G11C 11/2297* (2013.01); *G11C 13/0038* (2013.01); *G01R 31/318533* (2013.01); *G01R 31/281* (2013.01); *G01R 31/31713* (2013.01); *G06F 21/81* (2013.01); *H04W 52/00* (2013.01); *H04W 52/02* (2013.01); *H04W 52/30* (2013.01); *H04W 52/383* (2013.01)

USPC ............... 714/742; 714/14; 714/22; 714/721; 714/724; 714/727; 455/127.1; 455/127.5; 455/343.6; 455/572; 726/36; 324/764.01; 330/123; 330/127

(58) Field of Classification Search

CPC .. G11C 5/14; G11C 11/2297; G11C 13/0038; G01R 31/318533; G01R 31/281; G01R 31/31713; G01R 31/21721; G06F 21/81; H04W 52/00; H04W 52/02; H04W 52/30; H04W 52/38

USPC ..................... 714/14, 22, 721, 724, 727, 742; 455/127.1, 127.5, 343.6, 572; 726/36; 324/764.01; 330/123, 127

See application file for complete search history.

(56) References Cited

U.S. PATENT DOCUMENTS 4,475,047 A * 10/1984 Ebert, Jr. .......................... 307/66
4,506,386 A * 3/1985 Ichikawa et al. ............ 455/343.3

(Continued)

FOREIGN PATENT DOCUMENTS

| CN | 1033063 C | * 10/1996 | |
|---|---|---|---|
| GB | 2267167 A | * 11/1993 | ............... H04B 5/04 |

(Continued)

OTHER PUBLICATIONS

United Kingdom Search Report dated Oct. 7, 2010 in connection with United Kingdom Patent Application No. 1009306.0.

*Primary Examiner* — John J Tabone, Jr.

(57) ABSTRACT

An apparatus is provided that comprises a test circuit; a first receiver unit arranged to receive test commands and to provide the test commands to the test circuit; a power supply unit arranged to supply power to the test circuit and to the first receiver unit; a second receiver unit arranged to receive power commands. The second receiver is arranged to control the operation of the power supply unit in response to the power commands received by the second receiver unit.

30 Claims, 3 Drawing Sheets

(56) References Cited

U.S. PATENT DOCUMENTS

| | | | |
|---|---|---|---|
| 5,297,286 A * | 3/1994 | Uehara | 713/1 |
| 6,463,488 B1 * | 10/2002 | San Juan | 710/107 |
| 6,714,887 B1 * | 3/2004 | Wong et al. | 702/115 |
| 6,865,690 B2 * | 3/2005 | Kocin | 714/14 |
| 6,897,677 B2 | 5/2005 | Devlin et al. | 326/38 |
| 7,137,003 B2 * | 11/2006 | Krishnan et al. | 713/172 |
| 7,219,258 B2 * | 5/2007 | LeVangia et al. | 714/14 |
| 7,269,771 B1 * | 9/2007 | Young et al. | 714/729 |
| 7,277,815 B2 * | 10/2007 | Shih | 702/122 |
| 7,757,094 B2 * | 7/2010 | Krishnan et al. | 713/185 |
| 7,945,416 B2 * | 5/2011 | Haemel et al. | 702/117 |
| 8,108,941 B2 * | 1/2012 | Kanai | 726/30 |
| 2001/0034865 A1 * | 10/2001 | Park et al. | 714/724 |
| 2004/0011403 A1 * | 1/2004 | Martin | 137/312 |
| 2004/0095103 A1 * | 5/2004 | Kernahan | 323/272 |
| 2004/0267482 A1 * | 12/2004 | Robertson et al. | 702/118 |
| 2005/0044429 A1 * | 2/2005 | Gaskins et al. | 713/300 |
| 2005/0204243 A1 | 9/2005 | Hu et al. | |
| 2005/0257076 A1 | 11/2005 | Tsai et al. | |
| 2007/0021848 A1 * | 1/2007 | Huang | 700/22 |
| 2008/0082876 A1 * | 4/2008 | Yu et al. | 714/724 |
| 2008/0307134 A1 * | 12/2008 | Geissler et al. | 710/110 |
| 2009/0103376 A1 * | 4/2009 | Kanda | 365/189.05 |
| 2009/0150730 A1 * | 6/2009 | Takeda et al. | 714/721 |
| 2009/0295420 A1 | 12/2009 | Shiba | |
| 2010/0013493 A1 * | 1/2010 | Meijer et al. | 324/527 |

FOREIGN PATENT DOCUMENTS

| | | |
|---|---|---|
| JP | 2003289105 A | 3/2002 |
| JP | 2006017529 A | 6/2004 |

\* cited by examiner

REMOTE TESTING SYSTEM

CROSS-REFERENCE TO RELATED APPLICATIONS

The present application claims priority to United Kingdom Patent Application No. 1009306.0, filed Jun. 3, 2010, entitled "REMOTE TESTING SYSTEM," which application is assigned to the assignee of the present application and is hereby incorporated by reference into the present disclosure as if fully set forth herein.

TECHNICAL FIELD

The present disclosure relates to circuitry used to test an electronic device. In particular the present disclosure relates to the remote testing of electronic devices.

BACKGROUND

In applications and equipment development, it is necessary to test equipment and devices such as integrated circuits. In order for this testing to take place, development boards with the appropriate hardware and software required for carrying out a test are provided. Test commands are provided to and carried out by the development board. The test commands are run over a test interface provided on the development board. The test interface is compliant with a testing standard. Testing standards define, for example, how the tests will be carried out and how test commands will be interpreted.

An example of such a testing standard is a Joint Tests Action Group (JTAG) standard that provides testing functionality using a Test Access Port (TAP) Controller. TAP controllers are used to effect communication of test data on and off chip via a test interface which is known as a JTAG port. The functions of known TAP controllers are defined by IEEE Standard 1149.1-1990. That standard defines test logic which can be included in an integrated circuit to provide standardised approaches to testing the interconnections between integrated circuits, testing the integrated circuit itself, and observing or modifying circuit activities during the integrated circuits "normal" or "user mode" operation.

According to the IEEE standard, the TAP controller is capable of implementing a variety of different test modes. In each of these test modes, test data is supplied to the chip via an input pin of the TAP controller, and resultant data following the test is supplied off-chip via an output pin of the TAP controller. The resultant data is dependent on the test data and is compared with expected data to check the validity of the test. The input and output pins are referred to respectively as TDI and TDO. Many existing integrated circuits already incorporate a TAP controller of this type with the input and output pins TDI and TDO.

A tester may not be in the same geographical location as a development board that is to be tested. The computer from which the test commands originate will transmit test commands to a remote development board over a network.

Because the geographical difference between the development board and the tester, development boards are often permanently left on in order to facilitate remote access from locations in different time zones. The development boards are therefore continuously and unnecessarily consuming power. Additionally, while software resets can be carried out using a test command, a hard reset requiring power to the development board to be removed is difficult when accessing the board remotely.

SUMMARY

According to a first aspect, there is provided an apparatus comprising: a test circuit; a first receiver unit arranged to receive test commands and to provide the test commands to the test circuit; a power supply unit arranged to supply power to the test circuit and to the first receiver unit; a second receiver unit arranged to receive power commands and, responsive to the power commands, to control the operation of the power supply unit.

According to a second aspect, there is provided a method comprising: receiving test commands by a first receiver unit and providing the test commands to a test circuit; receiving power commands by a second receiver unit; and controlling the operation of a power supply unit in response to the power commands.

According to a third aspect, there is provided an apparatus comprising: a test circuit; a first receiver unit arranged to receive test commands compliant with the test circuit and provide said compliant test commands to the test circuit; and a second receiver unit arranged to receive additional commands compliant with the test circuit and, responsive to said compliant commands, to control the operation of a switch.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
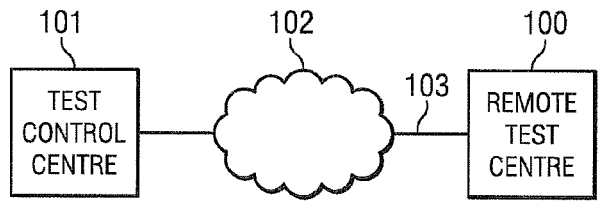
FIG. 1 shows a schematic diagram of the connection between a test control center and remote test center.

FIG. 1 shows a coupling between a test control center 101 and a remote test center 100. The test control center 101 may consist of hardware and software necessary to create test commands required to test a device as well as analyze the response to the commands. The test control center 101 may be a computer running a test command program or may be a developer entering test commands into the computer. The remote test center 100 may consist of a test device as well as any hardware or software required to execute the test commands on the test device.

In the embodiment of FIG. 1, the test control center 101 generates the test commands to be executed by the test device. The test commands are transmitted across a network 102 and connection 103 to the remote test center 100. The test device at the remote test center 100 may have an existing test interface. A test interface is compliant with a test standard of the device. The test standard may be an existing test standard or be specific or unique to the device. The test interface receives test commands that are compatible with that interface. The test interface may communicate the test commands to an integrated test controller on the test device. The integrated test controller carries out the testing of the test device in accordance with the test commands received over the test interface and the test standard.

The remote test center 100 receives the test commands over the network 102 and converts the test commands to be compatible with the remaining circuitry of the remote test center 100 and the test device. The remote test center 100 may convert the received test commands to be compatible with the test interface of the test device and therefore compatible with the testing standard of the device.

In one embodiment the test device may have a JTAG compliant test interface and the test commands are compliant with the JTAG standard. That may be in accordance with IEEE standard 1149.1, the proposed 1149.7 standard, or any other proposed JTAG standard. It should be appreciated that other embodiments may be used with other test standards or alternatively in non-standardized test arrangements.

The JTAG compliant test interface may consist of a four or five pin interface. The JTAG compliant test commands correspond to the pins of the JTAG interface and control the signals on these pins. The JTAG compliant test interface pins typically consist of a test data input (TDI), test data output (TDO), test mode select (TMS), test clock (TCK) and an optional test reset (TRST) pin. The TDI and TDO pins provide data to and from the integrated test controller of the test device. The TMS selects the test mode while the TCK and TRST control the clock and reset of the integrated test controller respectively.

Testing of the device at the remote test center 100 is carried out in accordance with the test commands transmitted from the test control center 101. The network 102 and connection 103 may be bidirectional and responses based on the testing in accordance with the received test commands and other information may be transmitted to test control center 101 from the remote test center 100. Test control center 101 may analyze the responses and use this information to determine if testing was successful or generate further commands.

Figure 2:
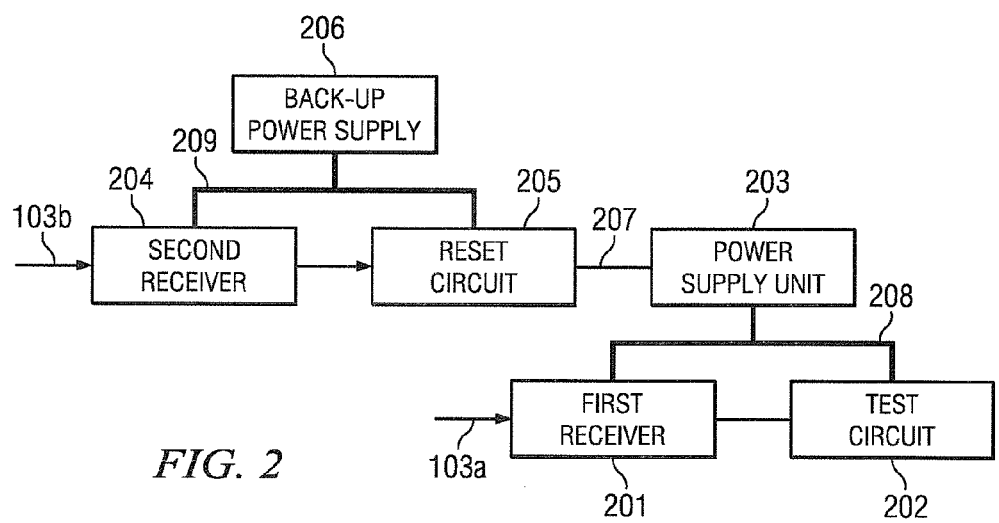
FIG. 2 shows a schematic diagram of a remote test center.

An example of a remote test center 100 is described in more detail with reference to FIG. 2. FIG. 2 shows a first receiver 201. The first receiver 201 is coupled to the network 102 via a first connection 103a. The first receiver 201 is further coupled to a test circuit 202. The test circuit 202 may comprise the test device and any necessary supporting hardware for carrying out a test on the test device. The test device may be an integrated circuit or may be more than one integrated circuit. The test device may be an embedded system on chip device. The test device and the supporting hardware may form a development board. The development board may provide the architecture necessary to download and execute a program on the test device.

An example of such a development board is a 7200 development mboard (mb519). It will be appreciated that any suitable development board may be used.

The first receiver 201 and the test circuit 202 are coupled to a power supply unit 203 via a main power line 208. The power supply unit 203 provides power required by the first receiver 201 and the test circuit 202 via the main power line 208. The power supply unit 203 may be any power supply unit capable of supplying the power necessary for the operation of the first receiver 201 and test circuit 202 and may form the main power supply of the remote test center 100. For example the power supply unit 203 may be an Advance Technology Extended (ATX) power supply unit. It will be appreciated that any suitable power supply unit capable of providing the necessary power may be used.

FIG. 2 shows a second receiver 204 coupled to the network 102 via a second connection 103b. The second receiver 204 is coupled to a reset circuit 205. The reset circuit 205 is described in more detail with reference to FIGS. 4 and 5. The reset circuit 205 is coupled to the power supply unit 203 via a power control line 207. The second receiver 204 and the reset circuit 205 are coupled to a back-up power supply unit 206 via a back-up power line 209.

The back-up power supply unit 206 provides power required by the second receiver 204 and the reset circuit 205 via the back-up power supply line 209. The back-up power supply 206 may also provide back-up power for the remote test center 203. The back-up power supply 203 may always be on. An example of a back-up power supply unit is a standby ATX supply. It will be appreciated that any suitable power supply unit capable of provided suitable back-up power may be used.

Figure 3:
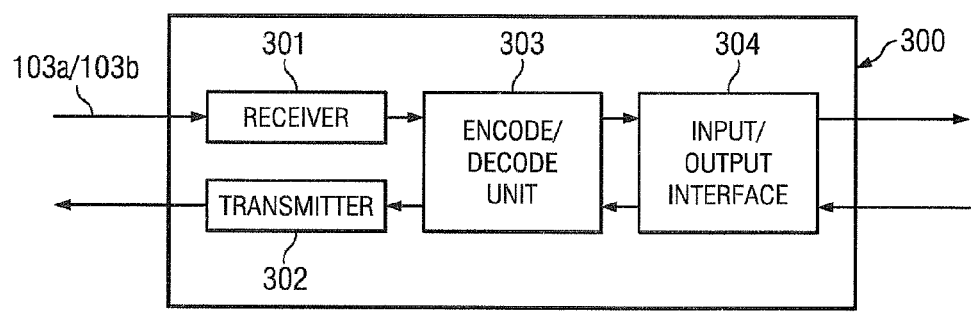
FIG. 3 shows a schematic diagram of a receiver.

The first receiver 201 and the second receiver 204 may consist of the same circuitry. FIG. 3 shows the circuitry of a receiver 300 that may be used as the first receiver 201 and/or the second receiver 202.

The first receiver 201 may receive the test commands over the first connection 103a and the second receiver 204 may receive power commands over the second connection 103b as will be described later. The commands received by either receiver, form an input into a receive (RX) unit 301 of FIG. 3. The receiver 300 additionally consists of a transmit (TX) unit which is capable of transmitting signals from the receiver 300 to the network 102.

Both the RX unit 301 and the TX unit 302 are coupled to an encode/decode unit 303. The commands received by the RX unit 301 are sent to the encode/decode unit 303 where they are decoded and converted into a format appropriate for an input/output (I/O) interface 304. As mentioned previously, the remote test center may convert the received test or power commands to be compatible with the test interface of the test device. The input/output interface 304 may be compatible with the test interface of the test device. The encode/decode unit 303 converts the received commands into a command format that is compatible with the test interface of the test device and the input/output interface 304.

The encode/decode unit 303 is coupled bi-directionally to the I/O interface 304. The I/O interface 304 outputs signals based on the received commands. I/O interface 304 may also receive signals and send these to the encode/decode unit 303 which converts and encodes the signals into a format compatible with the TX unit 302 and network 102.

Figure 4:
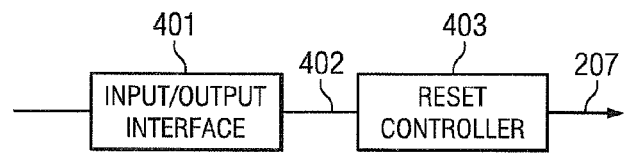
FIG. 4 shows a schematic diagram of a reset circuit.

As shown in FIG. 2, the second receiver 204 is coupled to the reset circuit 205. An example of the reset circuit 205 is shown in FIG. 4.

An input/output (I/O) interface 401 of the reset circuit 205 receives signals from the second receiver 204. Signals are transmitted to the I/O interface 401 from the I/O interface 304 of the second receiver 204. As mentioned previously, the I/O interface 304 of the second receiver 204 is compliant with the test interface of the test device and the signals transmitted from the second receiver 204 to the reset circuit 403 are compliant with the test interface. The I/O interface 401 of the reset circuit 205 is compliant with the test interface of the test device and as such it can receive the signals sent to it by I/O interface 304.

The I/O interface 401 transmits the signals received from the second receiver 204 to a reset controller 403 over connection 402. The reset controller 403 is further coupled to the power supply unit 203 (not shown) via a control line 207. The reset controller 403 receives signals from I/O interface 401 and controls the power supply unit 203 over control line 207 based on the power commands received by the second receiver 204 and transmitted to the reset circuit 205.

Figure 5:
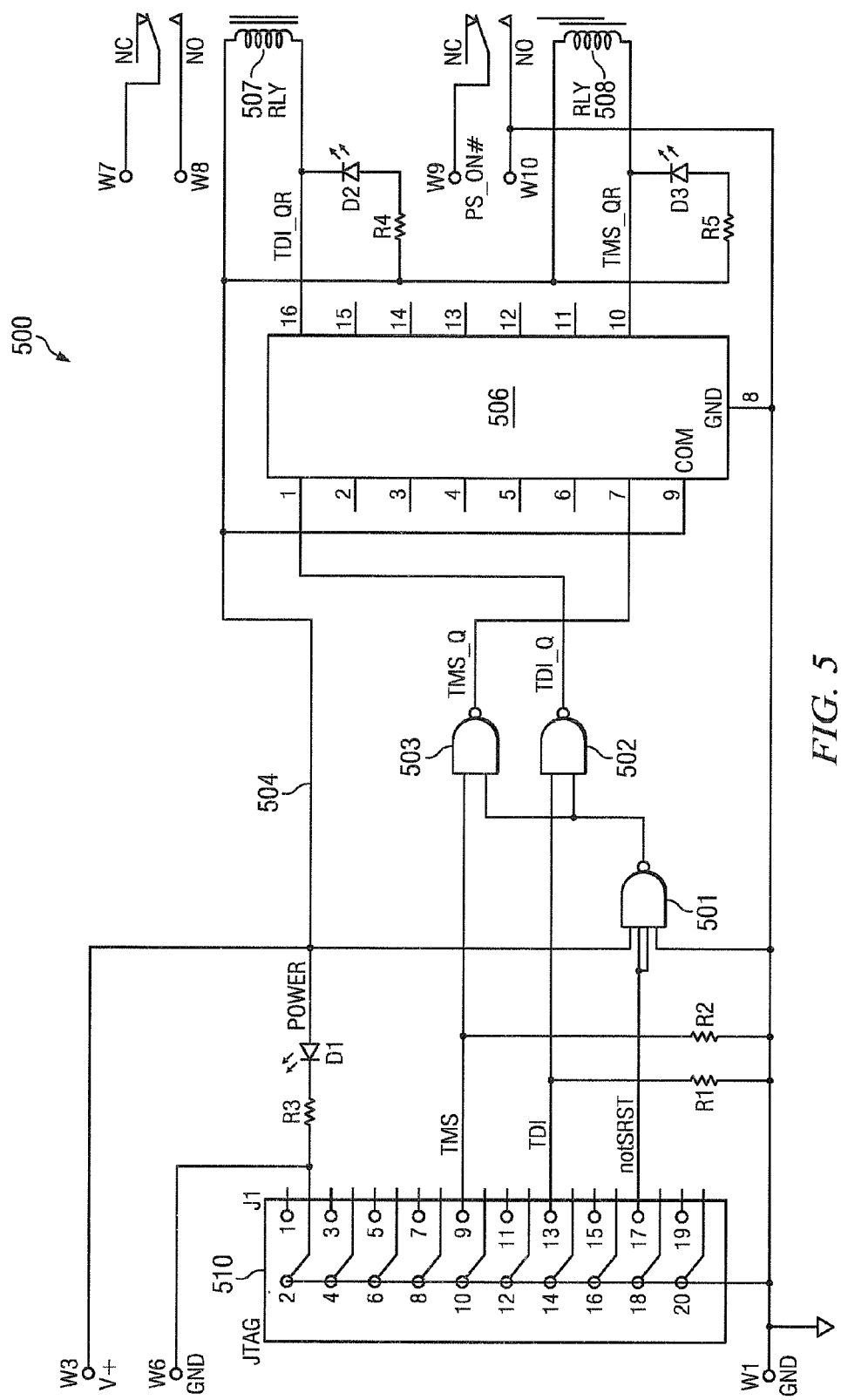
FIG. 5 shows a circuit diagram of a reset circuit.

FIG. 5 shows a specific embodiment of the reset circuit 205 where the test interface is a JTAG compliant interface and therefore the I/O interface 401 of the reset circuit 205 is a JTAG compliant interface. It will be appreciated that although FIG. 5 is described in relation to a JTAG interface 510 and JTAG signals TMS and TDI, the reset circuit 205 may be provided in relation to any other test interface and the JTAG interface 510 and signals TMS and TDI may be changed accordingly.

The reset circuit 500 of FIG. 5 shows the JTAG interface 510. The JTAG interface 510 shows the coupling of the TMS pin 9, TDI pin 13 and notSRST (TRST) pin 17 of JTAG interface 510. It will be appreciated that the present disclosure is not restricted to this and any of TDI, TDO, TMS, TCK, TRST (notSRST) may be used.

Although pin numbers have given throughout the specification, it will be appreciated that this is for ease of understanding only and other pin number may be used.

The TMS pin 9 is coupled to a first input of NAND gate 503. A second input of NAND gate 503 is coupled to an output of NAND gate 501. Test Data Input (TDI) pin 13 of the JTAG Interface 510 is coupled to a first input of NAND gate 502. The second input of NAND gate 502 is coupled to the output of NAND gate 501. A first and second input of NAND gate 501 are coupled to an inverted soft reset (notSRST) pin 17 of the JTAG Interface 510. As discussed, the output of NAND 501 is coupled to the second input of NAND 503 and the second input of NAND 502.

The NAND gates 501, 502 and 503 are any logic gates capable of providing a NAND on two input signals. For example a two-input Schmitt Trigger NAND gate may be used.

The JTAG interface 510 is coupled to a ground through connection W1. The TMS pin 9 is coupled to the ground via a second resistor R2 and TDI pin 13 is coupled to the ground via a first resistor R1. R1 and R2 act as pull-down resistors for pins 9 (TMS) and 13 (TDI) ensuring that a correct logic level is input into NAND gates 503 and 502 from these pins and the resistance of R1 and R2 are chosen accordingly.

A pin 2 of the JTAG interface 510 is coupled to a ground connection W6. The ground connection W6 is coupled to a first connection of a third resistor R3. A second connection of the third resistor R3 is coupled to a first connection of a first light-emitting diode (LED) D1. A second connection of the LED D1 is coupled to the back-up power supply 203.

The LED D1 and third resistor R3 act as a first status light. The first status light indicates that power has been applied to the reset circuit. The first status light is included for use in debugging and as such it will be appreciated that the LED D1 and the third resistor R3 are entirely optionally. The back-up power supply 203 is further coupled to a COM pin of an amplifier 506, to a first connection of a relay 507, a first connection of a relay 508, a second connection of the relay 507 via a series coupled fourth resistor R4 and a second light-emitting diode (LED) D2 and a second connection of relay 508 via a series coupled fifth resistor R5 and a third light-emitting diode D3. An output of the second LED D2 is coupled to a pin 16 of the amplifier 506 and output of the third LED D3 is coupled to a pin 10 of the amplifier 506.

The LED D2 and fourth resistor R4 act as a second status light and indicates the status of the pin 16. The LED D3 and fifth resistor R5 act as a third status light and indicates the status of the pin 10. In this embodiment that status lights indicate that the pins 10 and 16 have been pulled low. The second and third status lights are included for use in debugging and as such it will be appreciated that the LED D2, LED D3, the fourth resistor R4 and the fifth resistor R5 are entirely optionally.

Alternatively the LED D1, D2, D3 may be replaced by status communication lines that transmit a status on the status communication to the test control center 101. Additional communication circuitry may be provided for this or the status may be transmitted using the first 201 or second receiver 204.

A power input 14 of the NAND gate 501 is coupled to the back-up power supply. A ground input of the NAND gate 501 is coupled to ground via connection W1. The output of the NAND gate 503 (TMS_Q) is coupled to a pin 7 of the amplifier 506. The output of the NAND gate 502 (TDI_Q) is coupled to a pin 1 of the amplifier 506. The amplifier 506 is additionally coupled to ground connection W1 through its ground pin 8.

The relay 508 has a first and second contact. An armature of relay 508 is coupled to the first contact of relay 508 when the armature is in a default position of relay 508. The first contact of relay 508 may be coupled to a power supply on signal line. Thus the armature is coupled to the power supply on line when in the default position. The power supply on signal line may be coupled to the power supply 203 and may correspond to power control line 207 in FIG. 4. The second contact may be coupled to the connection W10. Connection W10 may be coupled to a high signal. It will be appreciated that this is by way of example only and connection W10 may be coupled to any indication the power is to turn on.

The relay 507 has a first and second contact. An armature of relay 507 is coupled to the first contact in a default position of relay 507. The first contact may be coupled to a connection W7 and hence the armature is coupled to W7 when in the default position. The second contact of the relay 507 is coupled to connection W8. The contacts of the relay 507 may be used to control the switching of any suitable device.

Figure 6:
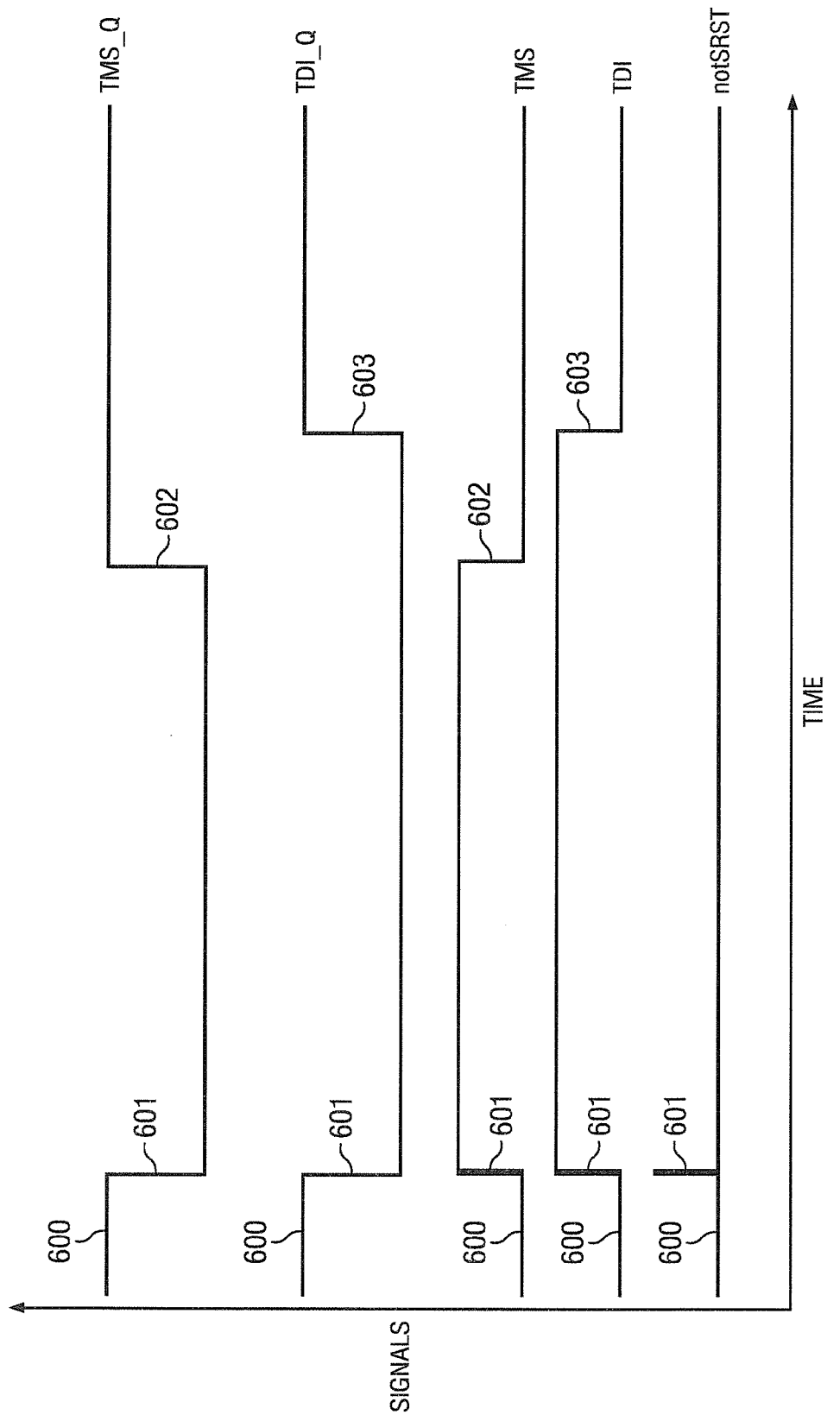
FIG. 6 is a signal diagram showing the behavior of the circuit of FIG. 5.

FIG. 6 shows the signals TMS_Q, TMS, TDI_Q and TDI against time for the test circuit 500 of FIG. 5. At time 601 notSRST goes high for an instant and then remains low. TMS and TDI go high at time 601. The output of NAND gate 501 is high and TMS_Q and TDI_Q go low. At time 602, the signal TMS goes low and notSRST is still low so the output of NAND gate 501 remains high and TMS_Q goes high. At time 603, the signal TDI goes low and notSRST is still low so the output of NAND gate 501 remains high and TDI_Q goes high.

Referring back to FIG. 1, test commands for testing a device may be generated at the test control center 101. These commands are used to test the test circuit 202 at the remote test center 100. The remote test center 100 may be at a remote location to the test control center 101 and the test commands are sent over the network 102 and connection 103.

In addition to the test commands, the test control center 101 generates power commands to be sent to the remote test center 100. The power commands are sent to the remote test center 100 over the network 102 and connection 103. The power commands control the power supply unit 203. For example, the power commands may switch the power supply unit 203 on and off and may selectively connect and disconnect the test circuit 202 and the first receiver circuit 201 from the power supply unit 203. It will be appreciated that the specific test commands are by way of example only and only one, some, all and/or additional power commands may be implemented.

The test commands transmitted over the network 102 may be received by the first receiver 201 and the power commands transmitted over the network 102 may be received by the second receiver 204. The first receiver 201 and the second receiver 204 are shown with network connections 103a and 103b respectively in FIG. 2. The first connection 103a may provide an exclusive and unique connection to network 102 for the first receiver 201 and the second connection 103b may provide an exclusive and unique connection to network 102 for the second receiver 204. The first receiver 201 and the second receiver 204 may have separate addresses on the network 102.

Alternatively the first receiver 201 and the second receiver 204 may have a same address on the network 102 and the received commands may be routed to the connection 103a and connection 103b based on the structure of the received command. For example, if the command corresponds to a power command, it is routed via the second connection 103b to the second receiver 204 and if the command is a test command, it is routed via the first connection 103a to the first receiver 201.

When test commands are sent over the network 102 the first receiver 201 acts as an intermediate between the network 102 and the test circuit 202. The first receiver receives test commands in a format suitable for transmission over a network over the network 102. As mentioned previously, the test circuit 202 has a test interface. The first receiver 201 converts the received test commands to a format suitable for test circuitry 202. In other words, the first receiver 201 provides test commands to the test circuit 202 that are compliant with the test interface of the test circuit.

In the embodiment of a receiver 300 according to FIG. 3, the RX unit 301 of the first receiver 201 sends the test commands received from the network 102 to the encode/decode unit 303. The encode/decode unit 303 decodes the test commands and converts them to a format suitable for the I/O interface 304. I/O interface 304 is compliant with the test interface used by the test circuit 202. I/O interface 304 then sends signals corresponding to the test commands to the test interface of the test circuit 202.

The test commands are received by the test circuit 202 and testing is carried out in accordance with those commands and in accordance with the specific test interface the test circuit is compliant with. Responses to the test commands (if any) may be transmitted back to the test control center 101 via the first receiver 201 and the network 102.

When power commands are sent over the network 102, the second receiver 204 acts as an intermediate between the network 102 and the reset circuit 205. The second receiver receives power commands in a format suitable for transmission over a network over the network 102. The second receiver 201 converts the received power commands to a format suitable for reset circuit 205. The format is set by the test interface. In other words, the second receiver 204 provides power commands to the reset circuit 205 that are compliant with the test interface of the test circuit.

In the embodiment of a receiver 300 according to FIG. 3, the RX unit 301 of the second receiver 204 sends the received power commands to the encode/decode unit 303 which decodes the power commands and converts them to a format suitable for the I/O Interface 304. I/O interface 304 is compliant with the test interface used by the test circuit 202. The I/O interface 304 then sends signals corresponding to the power commands to the I/O interface 401 of reset circuit 205.

The signals corresponding to the power commands are received by the I/O interface 401 of reset circuit 205 as shown in FIG. 4. The received test interface compliant signals are provided to the reset controller 403 from the I/O interface 401. The reset controller 403 interprets the received test interface compliant signals and converts them into power control signals on control line 207. The power control signals control power supply 203 based on the power commands sent over network 102. In other words, the reset controller 403 converts signals in a test interface compliant format into signals that are capable of controlling the power supply unit 203.

In the particular example of FIG. 5, the test interface is a JTAG test interface and the reset circuit 205 has a JTAG compatible interface 501. The functioning thereof will be described with reference to FIG. 6. It will be appreciated however that the circuitry of FIG. 5 may be adapted to test interface compatibility to other test interfaces.

The I/O Interface 510 of reset circuit 500 receives signals from the I/O Interface 304 of the second receiver 204. In this example embodiment, the I/O interfaces 304 and 510 are JTAG compliant interfaces. The JTAG signals received are the TMS, TDI and notSRST signals.

Referring to FIG. 6, at time 600 the signals TMS, TDI and notSRST are low. Because notSRST is low, the output of the NAND gate 501 is high and a high is input into the second input of NAND gate 502 and the second input of NAND gate 503. TMS provides a low input into the first input of NAND gate 503 and TDI provides a low input into the first input of NAND gate 502. The output of the NAND gates 502 and 503 are high and TMS_Q and TDI_Q are both high.

TMS_Q is amplified by the amplifier 506 and provided to the second connection of the relay 508 as a high signal TMS_QR. TDI_Q is amplified by amplifier 506 and provided to the second connection of the relay 507 as a high signal TDI_QR. The amplifier 506 may acts as a current amplifier and may be any amplifier capable of providing a current required by the relay 507 and relay 508. In one example the amplifier 506 may be an array of Darlington pair transistors. Alternatively the amplifier may be any amplifier suitable for providing sufficient current to the relays 507 and 508.

The first connection of the relay 508 is coupled to the back-up power supply. The first connection of relay 507 may also be coupled to a high. The first connection of the relay 507 and the relay 508 are therefore high. Because TMS_QR and TDI_QR are high at time 600, no current flows through the relay 507 and the relay 508 and the armature of each of the relays is in the default position for that relay. In the example embodiment of FIG. 5, the default position of the relay 508 is disconnecting the first receiver 201 and the test circuit 202 from power supply unit 203. The default position of the relay 507 may be a decoupled or off switch.

At time 601 the notSRST signal goes high for an instant to execute a soft reset of the reset circuit 500. When notSRST is high, the output of the NAND gate 501 goes low and regardless of the values of TMS and TDI, the output of the NAND gates 502 and 503 will go high. At time 601, no current will flow through the relays 507 and 508. Therefore by making notSRST high, the armatures of the relay 507 and 508 return to their default positions regardless of the values of TMS and TDI.

At time 601 TMS and TDI go high and notSRST returns to low. The output of the NAND gate 501 is high and is input into the second input of the NAND gates 502 and 503. With TMS and TMI high, the output of the NAND gate 502 TDI_Q and the NAND gate 503 TMS_Q go low and the amplified signals TMS_QR and TDI_QR go low. TMS_QR and TDI_QR cause the second connections of the relays 507 and 508 to go low and current flows through each of the relays 507 and 508. The current flowing in each of the relays 507 and 508 causes each armature to move. The armature of the relay 507 connects the second contact of that relay and the armature of the relay 508 connects to the second contact of that relay.

In the example embodiment, the armature of the relay 507 moves to provide a connection or on switch. The armature of the relay 508 moves to connect the power supply on line W8 207 to connection W10. W10 may be coupled to a high and the power supply on line 207 signals the power supply unit 203 to turn on.

At time 602 TMS goes low and the output of the NAND gate 503 goes high. The amplified signal TMS_QR is therefore high and the armature of relay 508 returns to its default position, turning the power supply unit 203 off. TDI remains high and relay 507 does not change. At time 603 TDI goes low and the output of the NAND gate 502 goes high. The amplified signal TDI_QR is therefore high and the armature of relay 507 returns to its default position.

It will be appreciated that the default positions of the relays is by way of example only and not limited to allowing power to be provided. The default position of the relay may be to disconnect circuitry from power in other embodiments of the disclosure.

Furthermore it will be clear from the above disclosure that only one relay may be provided. Alternatively additional relays may be provided that may selectively disconnect and connect the first receiver 201 and test circuit 202 independently from each other based on received signals. Relay 507 may be used to provide an additional switching function to control other circuitry at the remote test center 100. For example, relay 507 may be used to provide switching by pulling a mode pin high or low. The relay 507 may be used to replace mechanical dip switches that may be present in known remote test center circuitry.

In the above example, the signals TMS and TDI were used, however it will be appreciated that different, more or less signals may be provided that are compatible with the test interface used.

The circuitry of FIG. 5 is by way of example only and logic gates other than NAND gates may be used to effect a reset of the relays as described above.

The test and power commands may be incorporated into a test code transmitted to the remote test center 100. The remote , test center 100 may be powered up during a board connect sequence from the test control center 101. In this way the remote test center 100 is powered on just before an application is downloaded to it from the test control center 101.

The test control center 101 may use any appropriate software and hardware capable of generating and transmitting commands to the remote test center. An example of such software is an ST40 toolset.

The first receiver 201 and the second receiver 204 may comprise any circuitry capable of connecting to the network 102 and providing the specified interface. An example of such circuitry is a microConnect from ST Microelectronics.

Although only one connection to one test center 103 is shown, several connections to several test centers may be provided over network 102. One test control center 101 may be used to transmit commands to more than one remote test center 100 and/or to several network addresses at the same remote test center 100. Additionally a network address at the remote test center 100 may be accessed by more than one test control center 101.

Although the in the foregoing description a first receiver 201 and second receiver 204 have been described as separate entities, it will be appreciated that the first and second receiver may be part of the same receiver and signals received by the receiver may be routed to the test circuit 202 or reset circuit 205 accordingly. In this case connections 103a and 103b may form a single connection from the network 102.

In an embodiment of the present disclosure, the reset circuit 205 has an I/O interface 401 that is compliant with the test interface of the test circuit 202. The first receiver 201 and the second receiver 204 then may both have the same compatible I/O interfaces. This may allow the second receiver 204 to be achieved with a same standard component used to achieve the first receiver 201. This may be desired as the first receiver 201 circuitry may be readily available. Furthermore as the first and second receivers are identical, the power commands may be sent in the same format as the test commands. This would require no modification to an existing system at the test control 101 side.

Embodiments of the present disclosure may provide a hard reset of the test circuit 202 and first receiver 201. Embodiments may do this while using resources already available to both the tester and a remote testing environment such as the first receiver 201 circuitry and using standard commands from test control center 101.

Embodiments of the present disclosure may also provide two independent connections to a remote testing center. One connection may be used for commands for testing and the other for reset commands. This may have the advantage that the testing center is still accessible remotely even if both the first receiver unit and tested device have stalled.

In embodiments, the testing of a device may occur over a specified interface and the commands sent over the network are compliant with this interface. Embodiments of the present disclosure may allow commands compliant with the specified interface to be used for resetting or removing power from the testing device. This may ensure that the reset can be carried out with no modification to hardware or software used by the remote tester.

Furthermore because in some embodiments the commands are compliant with the specified interface, a standard existing receiver may be used at the remote testing side. In some embodiment this receiver may be a ST microConnect and the same as the circuitry used to receive commands for testing a device.

Furthermore embodiments of the present disclosure may take advantage of existing circuitry such as an included back-up power supply in order to provide the functionality of turning the main power off without the addition of further power supplies.

The disclosure is being described herein by way of reference to particular non-limiting examples. One skilled in the art will understand the general applicability of the disclosure. The scope of protection afforded by any patent granted hereon is defined in the appended claims.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   a test circuit within a test device;
   a first receiver unit configured to receive test commands from a network external to the test device and to provide the test commands to the test circuit;
   a power supply unit configured to supply power to the test circuit and to the first receiver unit;
   a second receiver unit configured to receive power commands from the network, and, responsive to the power commands, to control the operation of the power supply unit to selectively supply power to and remove power from the test circuit and the first receiver unit; and
   a reset circuit coupled between the second receiver unit and the power supply unit.

2. The apparatus of claim 1, wherein the test circuit includes a test interface configured to communicate between the test circuit and first receiver unit.

3. The apparatus of claim 2, wherein the first receiver unit is configured to provide the test commands to the test circuit in compliance with the test interface.

4. The apparatus of claim 2, wherein the second receiver is configured to provide the power commands to the reset circuit in compliance with the test interface.

5. The apparatus of claim 2, wherein the first receiver unit is configured to provide test commands over a first communication interface, the first communication interface being compliant with the test interface.

6. The apparatus of claim 2, wherein the second receiver unit is configured to provide power commands over a second communication interface, the second communication interface being compliant with the test interface.

7. The apparatus of claim 2, wherein the test interface is a JTAG compliant test interface and the first and second receiver units are configured to provide JTAG compliant test and power commands respectively.

8. The apparatus of claim 4, wherein the reset circuit comprises:
   a reset circuit interface configured to receive power commands from the second receiver unit; and
   a control circuit configured to control the operation of the power supply unit based on the power commands.

9. The apparatus of claim 8, wherein the reset circuit interface is compliant with the test interface.

10. The apparatus of claim 4, wherein the reset circuit is configured to cause the power supply unit to reset the test circuit.

11. The apparatus of claim 4, wherein the reset circuit is configured to cause the power supply unit to reset the first receiver unit.

12. The apparatus of claim 4, wherein the reset circuit is configured to cause the power supply unit to not supply power to the first receiver unit and the test circuit.

13. The apparatus of claim 1, further comprising a back-up power supply unit configured to provide power to the second receiver unit.

14. The apparatus of claim 1, wherein the test circuit is a JTAG compliant test circuit.

15. The apparatus of claim 14, wherein the first receiver unit and the second receiver unit are individually addressable over the network.

16. The apparatus of claim 1, wherein the first receiver unit and the second receiver unit respectively are configured to receive the test and power commands over a network.

17. A method, comprising:
    receiving test commands by a first receiver unit and providing the test commands to a test circuit;
    receiving power commands by a second receiver unit;
    controlling the operation of a power supply unit in response to the power commands. and
    providing a reset circuit coupled between the second receiver unit and the power supply unit.

18. The method of claim 17, further comprising converting the test commands to be compliant with a test interface of the test circuit.

19. The method of claim 18, further comprising converting the power commands to be compliant with the test interface of the test circuit and providing the converted power commands to the rest circuit.

20. The method of claim 17, wherein the test interface is JTAG compliant and the test and power commands are converted to JTAG compliant commands.

21. An apparatus, comprising:
    a test circuit;
    a first receiver unit configured to receive test commands compliant with the test circuit from a network external to the test device and to provide the compliant test commands to the test circuit; and
    a second receiver unit configured to receive additional commands compliant with the test circuit and, responsive to the compliant commands, to control the operation of a switch selectively coupling power to and decoupling power from the test circuit and the first receiver unit.

22. The apparatus of claim 21, wherein the test circuit includes a test interface configured to communicate between the test circuit and the first receiver unit.

23. The apparatus of claim 22, wherein the first receiver unit is configured to provide the test commands to the test circuit in compliance with the test interface.

24. The apparatus of claim 21, wherein the first receiver unit is configured to provide test commands over a first communication interface, the first communication interface being compliant with the test interface.

25. The apparatus of claim 21, wherein the second receiver unit is configured to provide the additional commands over a second communication interface, the second communication interface being compliant with the test interface.

26. The apparatus of claim 21, wherein the second receiver unit is further configured to control the switch such that the switch pulls a mode pin high.

27. The apparatus of claim 21, wherein the second receiver unit is further configured to control the switch such that the switch pulls a mode pin low.

28. An apparatus, comprising:
    a test circuit;
    a first receiving element configured to receive test commands from a network external to the test device and to provide the test commands to the test circuit;
    a power supply configured to supply power to the test circuit and to the first receiving element;
    a second receiving element configured to receive power commands from the network and, responsive to the power commands, to control the operation of the power supply to selectively supply power to and remove power from the test circuit and the first receiver unit; and
    a reset circuit coupled between the second receiver unit and the power supply unit.

29. An apparatus, comprising:
    a test circuit;
    first receiving element configured to receive test commands compliant with the test circuit from a network external to the test device and to provide the compliant test commands to the test circuit; and second receiving element configured to receive additional commands compliant with the test circuit and, responsive to the compliant commands, to control the operation of a switch selectively coupling power to and decoupling power from the test circuit and the first receiver element.

30. An apparatus, comprising:

a test circuit having a test interface configured to communicate between the test circuit and a first receiver unit, wherein the first receiver unit is configured to receive test commands and to provide the test commands to the test circuit;

a power supply unit configured to supply power to the test circuit and to the first receiver unit;

a second receiver unit configured to receive power commands and, responsive to the power commands, to control the operation of the power supply unit; and a reset circuit coupled between the second receiver unit and the power supply unit wherein the second receiver is configured to provide the power commands to the reset circuit in compliance with the test interface.

* * * * *